(12) United States Patent
Pieper et al.

(10) Patent No.: US 11,603,455 B2
(45) Date of Patent: Mar. 14, 2023

(54) WOOD PLASTIC COMPOSITE COMPOSITION COMPRISING A WAX COMPOSITION, METHOD FOR PRODUCING A WOOD PLASTIC COMPOSITE THEREFROM AND THE USE OF WAX COMPOSITIONS AS LUBRICANTS FOR THE PRODUCTION OF WOOD PLASTIC COMPOSITES

(71) Applicant: Sasol Wax GmbH, Hamburg (DE)

(72) Inventors: Oliver Pieper, Hamburg (DE); Mark Veit, Bonningstedt (DE); Thomas Haas, Winsen/Luhe (DE); Julius Gurr, Hamburg (DE); Andreas Krause, Hamburg (DE)

( * ) Notice: Subject to any disclaimer, the term of this patent is extended or adjusted under 35 U.S.C. 154(b) by 347 days.

(21) Appl. No.: 16/763,169

(22) PCT Filed: Dec. 10, 2018

(86) PCT No.: PCT/EP2018/084248
§ 371 (c)(1),
(2) Date: May 11, 2020

(87) PCT Pub. No.: WO2019/110852
PCT Pub. Date: Jun. 13, 2019

(65) Prior Publication Data
US 2020/0385560 A1 Dec. 10, 2020

(30) Foreign Application Priority Data
Dec. 8, 2017 (EP) .................................... 17206284

(51) Int. Cl.
| | | |
|---|---|---|
| C08L 27/06 | (2006.01) | |
| C08J 3/20 | (2006.01) | |
| C08L 23/00 | (2006.01) | |

(52) U.S. Cl.
CPC ............... *C08L 27/06* (2013.01); *C08J 3/201* (2013.01); *C08L 23/00* (2013.01); *C08L 2205/03* (2013.01); *C08L 2205/06* (2013.01)

(58) Field of Classification Search
CPC ...... C08L 27/06; C08L 23/00; C08L 2205/03; C08L 2205/06; C08J 3/201
USPC ........................................................ 524/13
See application file for complete search history.

(56) References Cited

U.S. PATENT DOCUMENTS

2006/0094802 A1  5/2006  Gibson

FOREIGN PATENT DOCUMENTS

| WO | 2003/035393 | 5/2003 | |
|---|---|---|---|
| WO | WO-03035393 A1 * | 5/2003 | .............. C08L 27/06 |
| WO | 2013/120792 | 8/2013 | |
| WO | WO-2013120792 A1 * | 8/2013 | .............. C08K 5/01 |

* cited by examiner

*Primary Examiner* — Ling Siu Choi
*Assistant Examiner* — Ronald Grinsted
(74) *Attorney, Agent, or Firm* — Bushman Werner, P.C.

(57) ABSTRACT

The invention relates to wood plastic composite compositions comprising a wax composition, wherein the wood plastic composite composition has superior properties in the processing thereof. The wax composition is characterized by its dynamic viscosity at 120° C., congealing point, content of molecules in which the carbon chain is linear and content of oxidized hydrocarbons.

15 Claims, No Drawings

WOOD PLASTIC COMPOSITE COMPOSITION COMPRISING A WAX COMPOSITION, METHOD FOR PRODUCING A WOOD PLASTIC COMPOSITE THEREFROM AND THE USE OF WAX COMPOSITIONS AS LUBRICANTS FOR THE PRODUCTION OF WOOD PLASTIC COMPOSITES

The invention relates to wood plastic composite compositions comprising a wax composition, wherein the wood plastic composite composition has superior properties in the processing thereof. The wax composition is characterized by its dynamic viscosity at 120° C., congealing point, content of molecules in which the carbon chain is linear and content of oxidized hydrocarbons.

BACKGROUND OF THE INVENTION

Wood plastic composites (WPC) are composites, which consist of high amounts of wood (typically wood flour, wood fibers or other lignocelluloses), thermoplastic polymers and various additives. They can be processed by thermoplastic polymer techniques such as extrusion, injection moulding or compression moulding. WPC are widely used as non-load-bearing materials in the construction industry, in furniture, cars and floorings or coverings (e.g. terrace deckings), especially as substitute for tropical woods, solid woods or other composite materials. The wood content is usually more than 50 wt.-%. As matrix material various thermoplastics such as high density polyethylene (HDPE), polypropylene (PP) or polyvinylchloride (PVC) can be used. The advantages of these products are low water uptake, high temperature stability, high durability, its appearance and a low price.

The manufacture of WPC is based on the production technologies of the polymer industry. Independent of the processing equipment the manufacture may be divided into the following basic steps: feed-in, blending, compounding, and forming. The feed-in of the polymer, filler and further additives needs to be precise at adequate speeds. The blending of the ingredients may be done as a standalone process, common in polyvinyl chloride processing, in which the temperatures stay below the melting point and a homogeneous granular dry-blend is produced. The blending may also be integrated into the next processing step, the compounding, which is common in polyolefin processing. During compounding the polymer is exposed to heat and shear and thereby plasticized. Additionally, the fillers and additives are dispersed to achieve a homogeneous melt, which is called compound.

The compounding step also serves to remove moisture and gases from the compound, which is particularly critical in the case of WPC. After compounding, the material may be directly formed into products (one-step process) or pelletized for later forming processes (two-step process).

It is known from polymer processing that waxes in general can be used as lubrication agents. For WPC ethylene bis-stearamide (EBS), zinc stearate, paraffin waxes and oxidized polyethylene (PE) or combinations thereof are used as standard lubricants.

Waxes are defined as chemical compositions, which have a drop melting point above 40° C., are polishable under slight pressure, are knead-able or hard to brittle and transparent to opaque at 20° C., melt above 40° C. without decomposition, and typically melt between 50 and 90° C. with exceptional cases up to 200° C., form pastes or gels and are poor conductors of heat and electricity.

Waxes can be classified according to various criteria such as e.g. their origin. Here, waxes can be divided into two main groups: natural and synthetic waxes. Natural waxes can further be divided into fossil waxes (e.g. petroleum waxes) and nonfossil waxes (e.g. animal and vegetable waxes). Petroleum waxes are divided into macrocrystalline waxes (paraffin waxes) and microcrystalline waxes (microwaxes). Synthetic waxes can be divided into partially synthetic waxes (e.g. amide waxes) and fully synthetic waxes (e.g. polyolefin- and Fischer-Tropsch waxes).

Paraffin waxes are originating from petroleum sources. They are clear, odor free and can be refined for food contact. They contain a range of n-alkanes and branched alkanes as well as some cyclo-alkanes. Raw or crude paraffin waxes (slack waxes) have a great number of short-chained alkanes ("oils"), which are removed when further refined. Different distributions and qualities of paraffin waxes can be obtained. Refining may include deoiling, distillation and hydrogenation.

Synthetic Fischer-Tropsch waxes or hydrocarbons originating from the catalyzed Fischer-Tropsch synthesis of syngas (CO and $H_2$) to alkanes contain predominantly n-alkanes, a low number of branched alkanes and basically no cyclo-alkanes or impurities like e.g. sulfur or nitrogen. That also means that depending on the carbon chain length and the content of branching of the alkanes in the Fischer-Tropsch wax different congealing point or melting ranges can be obtained. Therefore Fischer-Tropsch waxes can generally be classified in low melting (congealing point of 20 to 45° C.), medium melting (congealing point of 45° C. to 70° C.) and high-melting (70 to 105° C.).

Another source for synthetic waxes/hydrocarbons are products obtained from the oligomerization/polymerization of olefinic monomers, possibly followed by hydrogenation.

Additionally, all hydrocarbon waxes can be oxidized by different methods, the easiest one being the process of reacting waxes with oxygen or air, preferably in presence of a catalyst. The oxidation introduces different functionalities (hydroxyl, carbonyl etc.) without changing the alkyl-branching or total carbon number of the molecules. A typical ratio of functionalities formed during oxidation is 1.5 parts ketones to 1 part acids to 1 part esters to 1 part hydroxyls. Formed internal esters (e.g. lactones) can be opened by saponification with metal soaps, which also saponifies the other carboxyl sites in the oxidized wax molecule. The degree of oxidation reflected for example by the acid number of the oxidized wax can be adjusted by the oxidation procedure. Therefore, the content of oxidized hydrocarbons can be adjusted.

In general polyethylene (PE) waxes have higher molecular weights than paraffin or Fischer-Tropsch waxes resulting in higher viscosities and a different chemical structure. Due to the production of polyethylene waxes they have a larger amount of molecules with two carbon atoms difference per molecule, for example. The same is true for most of the oxidized derivatives thereof. Polyethylene waxes also have a different pattern of branches, e.g., up to hexyl-branches in the side chains.

It is known that during processing of WPC the wood filler increases heat dissipation and lowers melt strength and elasticity. This leads to reduced processability and increased susceptibility to surface defects. In general practice these effects are counteracted by an increased dosage of common lubricants. Such lubricants are further classified as internal or external lubricants or both.

Internal lubricants shorten the fusion times of the molten polymer in the wood-polymer composition by increasing the molecular diffusion. External lubricants migrate to the surface of the polymer mass in a fused state to reduce the friction of the polymer particles on the metal and melt interface. External lubricants need to have a suitable melting point or melting range to assure a good fusion control. They reduce the apparent viscosity and the slip between melt and processing machinery. That results in reduced screw torque and power consumption. Therefore, the viscosity of the external lubricant plays an important role.

That means a good external lubrication is reflected by longer fusion times and a good internal lubrication by higher fusion torques. But in total it is desirable to achieve a good compromise between fusion time and fusion torque or external and internal lubrication, respectively. A lower fusion torque coming from external lubrication results in less energy consumption and surging, but due to the reduction of frictional heat also in a longer fusion time and gelation delay. If the fusion time becomes too long, no proper fusion of the polymer can be achieved and the mechanical properties of the final product (e.g. impact and tensile strength) will suffer.

Wood composites use about twice as much lubricant as standard plastics. For highdensity PE, with a typical 50 wt.-% to 60 wt.-% wood content, lubricant level can be 4 wt.-% to 5 wt.-%, while a similar wood-polypropylene composite typically uses 1 wt.-% to 2 wt.-%.

U.S. Pat. No. 7,390,846 B2 discloses a lubricant composition for PVC-WPC comprising around 4 wt.-% chlorinated PE wax (CPE-3615P from Dow), 0.5 wt.-% to 1 wt.-% Ca-stearate, around 1 wt.-% paraffin wax (Marklube L-106) and around 0.2 wt.-% oxidized PE-wax (AC629A from Honeywell). A similar wood plastic composite is disclosed in US 2006/0293418 A1. Ca-stearate as disclosed in both references is a high-melting (140-160° C.) saponified hydrocarbon acid (saponified fatty acid), which has no acid number and therefore is no oxidized hydrocarbon as defined herein.

CN 103408959 discloses different wax blends for the use in WPC, also containing oxidized and modified waxes as compatibilizers.

U.S. Pat. No. 7,449,504 B2 teaches FT waxes but claims the addition of maleic-anhydridegrafted metallocene polyethylene waxes to WPC to improve the mechanical properties and reduce water absorption.

US 2005/0222310 A1 discloses waxes as lubricants for filled plastics, wherein natural and synthetic waxes can be used, including Fischer-Tropsch wax, montan wax and/or oxidized and non-oxidized polyolefin wax.

During processing of neat polymers such as PVC, high viscosity lubricants induce higher shear forces into the polymer melt leading to shorter fusion times and enhanced melt homogeneity. From the lubrication of neat PVC it is expected that waxes with higher viscosities such as polyolefin waxes and oxidized waxes show superior results.

It is therefore an aim to find a sufficient lubrication agent for WPC which shows good processing properties, is cost effective and does not have a negative impact on the mechanical characteristics and quality of the WPC.

DESCRIPTION OF THE INVENTION

It was surprisingly found that wood plastic composite compositions comprising
at least one wood component;
at least one thermoplastic polymer;
wax hydrocarbons having 15 to 110 carbon atoms; and
oxidized hydrocarbons, preferably oxidized hydrocarbons having 15 to 110 carbon atoms consisting of (modified) hydrocarbons having at least one of hydroxyl-, carbonyl-, carboxylate- and lactone-group,
wherein the mixture consisting of the wax hydrocarbons and the oxidized hydrocarbons is a wax composition having
a dynamic viscosity at 120° C. of below 25 mPa·s;
a content of molecules in which the carbon chain is linear of more than 65 wt.-%;
a congealing point according to ASTM D 938 from 55° C. to 105° C.;
a content of oxidized hydrocarbons of at least 1 to 20 wt.-%; and
an acid number according to ASTM D 1386 of 0.1 to 10 mg KOH/g show superior lubrication effects and good mechanical properties.

The wax composition is a wax. Preferably the wax composition results from a partial oxidation of the wax hydrocarbons. The oxidation is preferably carried out without altering the chain length and the alkyl-branching. However, the wax composition may also be obtained by mixing the oxidized hydrocarbons and the wax hydrocarbons prior to obtaining the wood plastic composite compositions or during the process of obtaining the wood plastic composite compositions together with the other components. In any case the parameters for the wax composition are those of a mixture consisting exclusively of the oxidized hydrocarbons and the wax hydrocarbons, even if such mixture has not been separately obtained prior to the manufacture of the wood plastic composite composition.

The content of the linear molecules and the low viscosity of the wax composition results in improved external lubrication effects and the content of oxidized hydrocarbons supports internal lubrication. An optimal ratio between both is obtained by the above composition.

The properties of the wax composition are defined by means of the dynamic viscosity at 120° C., the content of molecules in which the carbon chain is linear, the congealing point and the content of oxidized hydrocarbons.

The dynamic viscosity is calculated by the kinematic viscosity of the wax composition determined according to DIN 51562-1 at 120° C. with a capillary (Ubbelohde viscometer) and the density of the wax composition is determined according to EN ISO 12185 at 120° C. with an oscillation densitometer (Oscillating U-tube method) by using the following formula:

$$\eta(\text{dynamic viscosity}) = \nu(\text{kinematic viscosity}) \cdot \rho(\text{density})$$

or determined according to DIN 53019-1 at 120° C. with a rotational viscometer. The content of molecules in the wax composition in which the carbon chain is linear can be determined by gas chromatography (EWF Method 001/03 of the European Wax Federation).

The molar mass (number average) and/or the number of carbon atoms can be determined and calculated by gas chromatography (EWF Method 001/03 of the European Wax Federation), by gel permeation chromatography or $^{13}$C-NMR, preferably by gel permeation chromatography. For the latter o-xylene is used as mobile phase and two subsequent columns from the company Agilent (PLgel 5 μm MIXED-D, 300×7.5 mm). As internal standard different alkanes in the range from C12-60 (molecular weight=120 to 842 g·mol$^{-1}$) and two polyethylene waxes with a molecular weight of 1230 and 2010 g·mol$^{-1}$ are used. A sample concentration of 10 mg/20 g solvent, 100 μl injection volume, a temperature of 100° C. and a flow rate of 1 ml/min are used.

The content and type of oxidized hydrocarbons can be determined by two-dimensional high temperature gas chromatography (GC×GC) and subsequent mass spectrometry (e.g. with a time of flight mass spectrometer), elementary analysis or $^1$H- and $^{13}$C-nuclear magnetic resonance spectroscopy. Another way to define the content of oxidized hydrocarbons in the wax composition is the acid number according to ASTM D 1386, which reflects the amount of potassium hydroxide necessary to neutralize the free acids and/or the peroxide number according to ASTM D 1832, which reflects the amount of compounds that are able to oxidize potassium iodide.

In a preferred embodiment the wax composition has jointly or independent of each other a content of oxidized hydrocarbons of at least 1.1 to 15.5 wt.-%, a peroxide number according to ASTM D 1832 of 1 to 10 mEqu/1000 g, preferably 2 to 5 mEqu/1000 g, and/or a ratio of alcohols to esters/acids to ketones/aldehydes of 1:0.1 to 3:0.1 to 2, preferably 1:0.1 to 0.2:0.1 to 0.25.

The wax hydrocarbons may be a paraffin wax or a synthetic wax comprising no oxidized hydrocarbons or a combination thereof.

Hydrocarbons according to the invention are molecules consisting exclusively of carbon and hydrogen, such as alkanes. Wax hydrocarbons are hydrocarbons having 15 to 110 carbon atoms. Oxidized hydrocarbons are hydrocarbon molecules comprising at least one oxygen moiety selected from the group consisting of hydroxyl, carbonyl, carboxylate or lactone (the modification), such as alcohols, esters/acids or ketones/aldehydes. Molecules in which the carbon chain is linear are oxidized hydrocarbons and wax hydrocarbons that each are without branched and cyclic structures.

The wax hydrocarbons preferably are a Fischer-Tropsch wax, which according to the invention is defined as originating from the Cobalt- or Iron-catalyzed Fischer-Tropsch synthesis of syngas (CO and $H_2$) to alkanes. The crude product of this synthesis is separated into liquid and different solid fractions by distillation. These wax hydrocarbons contain predominantly n-alkanes, a low number of branched alkanes and basically no cyclo-alkanes or impurities like e.g. sulfur or nitrogen.

As Fischer-Tropsch waxes consist of methylene units, they have a molecular pattern dominated by an evenly increasing or decreasing number of molecules at each carbon atom chain length. This can be seen in GC-analyses of the wax.

The branched molecules of the Fischer-Tropsch wax also being wax hydrocarbons preferably contain more than 10 wt.-%, more preferably more than 25 wt.-% methyl branches and/or no quaternary carbon atoms. This can be seen in NMR-measurements of the wax.

The wax hydrocarbons from the Fischer-Tropsch wax can also be oxidized to give the oxidized hydrocarbons according to the invention. The oxidation is preferably carried out without altering the chain length and the alkyl-branching.

In further preferred embodiments the wax composition has jointly or independent of each other:
a dynamic viscosity at 120° C. of 10 mPas·s or below;
a content of molecules in which the carbon chain is linear of above 75 wt.-%, preferably above 80 wt.-%;
a congealing point according to ASTM D 938 from 75° C. to 105° C., preferably from 75° C. to 85° C.;
a density at 120° C. according to EN ISO 12185 below 0.9 g·cm$^{-3}$, preferably 0.8 g·cm$^{-3}$ or below, and more preferably between 0.7 g·cm$^{-3}$ and 0.8 g·cm$^{-3}$; and
a molar mass (number average) between 300 to 1500 g·mol$^{-1}$, preferably between 400 to 1300 g·mol$^{-1}$, and more preferably between 500 to 800 g·mol$^{-1}$.

The dynamic viscosity can also be determined at 180° C., which correlates with usual processing temperatures of wood plastic composites. At this temperature the viscosity of the wax composition preferably is 10 mPa·s or below and more preferably 5 mPa·s and below.

In a preferred embodiment the wood plastic composite composition comprises 20 to 80 wt.-% or 25 to 400 phw thermoplastic polymer, more preferably 30 to 70 wt.-% or 40 to 235 phw. Phw is herein defined as weight parts per hundred parts based on the weight of the wood components. If the content is not specified in phw, the wood plastic composite composition may contain 20 to 80 wt.-% of wood components.

The wax composition is preferably comprised in the wood plastic composite composition with a content of 0.1 to 40 phw or 0.1 wt.-% to 25 wt.-%, more preferably 0.25 to 20 phw or (additionally or independently) alternatively defined 0.2 wt.-% to 15 wt.-%.

In a preferred embodiment the thermoplastic polymer in the wood plastic composite composition is selected from the group of polyolefines, such as polyethylene or polypropylene, chlorine-containing polymer, polyvinylchloride or mixtures thereof, preferably polyvinylchloride. Copolymers and polystyrenes are also included herein.

The wood plastic composite composition preferably consists to more than 50 wt.-%, more preferably more than 90 wt.-%, of wood components, thermoplastic polymer and wax.

The wood components may consist of lignocelluloses originating from non-wood or wood plants, i.e. from annual plants or perennial plants respectively, or mixtures thereof. Suitable examples for the wood components may come from quick growing plants such as bamboo or palms.

The invention also includes a method of processing a wood plastic composite composition comprising the steps of
compounding
at least one wood component;
at least one thermoplastic polymer; and
the wax composition as described herein, or the wax hydrocarbons and the oxidized hydrocarbons added separately from each, both as described herein,
at temperatures above the congealing point of the wax composition to obtain a wood plastic composite compound;
and
consolidating the compound, preferably by profile extrusion, compression molding or injection molding, at temperatures above the melting point of the thermoplastic polymer and below the decomposition temperature of the wood components, preferably between 150 to 200° C., to obtain a finished wood plastic composite.

Furthermore, the use of 0.1 to 40 phw, more preferably 0.25 to 20 phw, of the wax composition described herein, as lubricant in the processing of a wood plastic composite composition described herein, is claimed.

EXAMPLES

Different waxes shown in Table 1 have been used as lubricants in the production of wood plastic composites according to the invention.

TABLE 1

| Wax | Licocene PE4201 | Sasol-wax H105 | Wax composition A | Wax composition B | Wax composition C | Wax composition D | Wax composition E |
|---|---|---|---|---|---|---|---|
| Congealing point [° C.] | n.a. | 102 | 57.5 | 77.5 | 81 | 84 | 102 |
| Drop melting point [° C.] | 125-130 | 117 | 55.3 | 94.1 | 86.1 | 97.7 | 114.6 |
| Density [g · cm$^{-3}$] @120° C. | 0.97 @ 23° C. | 0.80 | 0.745 | 0.76 | 0.76 | 0.77 | 0.80 |
| Dynamic viscosity at 120° C. [mPa · s] | — | 17.9 | 3.0 | 4.6 | 6.7 | 10.0 | 24.4 |
| Dynamic viscosity at 140° C. [mPa · s] | 40-80 | — | — | — | — | — | — |
| Dynamic Viscosity at 180° C. [mPa · s] | — | 7.3 | 1.2 | 2.2 | 2.6 | 3.6 | 7.7 |
| Molar mass (number average) | >1500 | 1110* | 410#  /  620* | 600# | 620* | 710* | 1030* |
| Content of linear molecules [%]* | n.d. | 99.2 | 70.2 | 81.8 | 87.6 | 87.5 | 95.2 |
| Type of branching$^x$ | Aliphatic | | | | Methyl | | |
| Further characteristics$^x$ | — | | | No quaternary carbon atoms | | | |
| Acid number [mg KOH/g] | n.a. | <0.1 | 0.4 | 0.3 | 8.8 | 8.1 | 8.9 |
| Content of oxygenates# | n.a. | — | 4.37% | 1.18% | 15% | 14% | 15% |
| Peroxide number | n.a. | n.a. | 44.0 | 2.3 | 2.8 | n.a. | n.a. |
| Type of oxygenates# | n.a | n.a | Alcohols:Esters:Ketones/Aldehydes 1:0.14:0.14/ 1:0.15:0.23 | | Alcohols:Esters/Acids:Ketones/Aldehydes 1:2:1.5 | | |

Properties of used waxes; *determined by GPC, #determined by GC × GC, $^x$determined by NM For polyethylene waxes such as Liconcene PE4201 a congealing point cannot be determined, only a drop melting point according to ASTM D 3954 can be determined.

The dynamic viscosity is either calculated by the kinematic viscosity of the wax composition/wax determined according to DIN 51562-1 at 120° C. with a capillary and the density of the wax composition/wax is determined according to EN ISO 12185 at 120° C. with an oscillation densitometer by using the following formula:

$$\eta(\text{dynamic viscosity}) = \nu(\text{kinematic viscosity}) \cdot \rho(\text{density})$$

or determined according to DIN 53019-1 at 120° C. and 180° C. on a rotational viscometer. The viscosity for Licocene PE4201 was taken from public available data and the data for Sasolwax H105 and Waxes A to F was determined on a HaakeRheoStress 600 from Thermo Scientific.

The content of molecules in which the carbon chain is linear and the molar mass (number average) were determined by gas chromatography (EWF Method 001/03 of the European Wax Federation) on an Agilent 7890A (instrument parameters, see table 2) and gel permeation chromatography on a Varian PL-GPC 220 with o-xylene as mobile phase (instrument parameters, see table 3).

TABLE 2

Conditions of GC-measurements according to EWF Method 001/03

| | |
|---|---|
| Sample concentration | 20 mg/20 ml solvent |
| Carrier gas | Hydrogen; 71 cm/sec |

TABLE 2-continued

Conditions of GC-measurements according to EWF Method 001/03

| | |
|---|---|
| Column temperature | Start 75° C.; 25° C./min to 100° C.; 8° C./min to 325° C.;325° C. for 15 min |
| Column dimensions | 25 m; 0.32 mm i.d.; 0.12 μm film thickness |
| Injector type | Cool on column |
| Result report | Area % |

TABLE 3

Conditions of GPC-measurements

| | |
|---|---|
| Sample concentration | 10 mg/20 g solvent (o-xylene) |
| Pump flow | 1 ml/min |
| Temperature Detector | 100° C |
| Differential Refractometer Cell Volume | Deflection 8 μl |
| Wavelength | 890 ± 50 nm |
| Autosampler | |
| Injection volume | flushed fixed loop; 100 μl |
| Columns— 2 X PLgel 5μm Mixed-D | 300 × 7.5 mm |
| Specifications | 200 – 400 000 Daltons |
| Software | Cirrus GPC Software |

The content and type of oxidized hydrocarbons was determined by GC×GC with subsequent mass spectrometry on a Pegasus 4D GC×GC from Leco Corporation (St. Joseph, USA) equipped with a cryogenic $N_2$ dual jet modulator (instrument parameters, see table 4).

TABLE 4

Conditions of GC × GC-measurements

| | |
|---|---|
| Carrier gas | Helium; 1.3-1.4 ml/min |
| Column temperature | Start 50/100° C. for 2 min; 3° C./min to 360/340° C.; hold for 5min |
| Column dimensions | $1^{st}$ column: 30 m; 0.25 mm i.d.; 0.1/0.25 μm film thickness $2^{nd}$ column: 1.3 m; 0.1 mm i.d.; 0.1 μm film thickness |
| Injector type | Cool on column/ Split (ratio 10:1) |
| Result report | Area % |

The acid number was determined according to ASTM D 1386.

The peroxide number was determined according to ASTM D 1832.

To evaluate the different waxes dry-blends of PVC-wood plastic composites according to table 5 were produced with a heating-/cooling-mixer combination FML 30/KM 85 from Reimelt Henschel MischSysteme GmbH. All ingredients were inserted into the heating mixer. Each charge was little above 4 kg. The mixer was not actively heated.

The dry-blend was passively heated by input of kinetic energy. The rotational frequency was set to 3000 rpm. This translates into a peripheral speed of 33 m/s. After the dry-blend had reached 120° C. it was transferred into the cooling mixer, which was actively water cooled. The dry-blend was cooled to 45° C. and then ejected into a bag for storage.

For the evaluation of the lubricating effect a plastograph of the dry blends was utilized. The model used was the ThermoScientific Haake Rheomix OS driven by the PolyLab OS RheoDrive7. It was equipped with Banbury rotors.

The weight of each dry blend charge was set to 300 g and was compensated for its individual moisture content. The moisture contents of the dry-blends varied around 1.2%. The chamber temperature of the plastograph was set to 180° C. and the rotational speed was set to 30 rpm. The data recording was started at a force of 10 Nm and continued until the compound did show signs of degradation through raising torque and temperature. The process was ended when the temperature reached 202° C. or the torque increased significantly.

TABLE 5

Produced PVC-WPC dry blend mixtures (all amounts in phw)

| | | | Comp. | | Inv. | | | | |
|---|---|---|---|---|---|---|---|---|---|
| Component | Product | Function | Ref. | 1 | 1 | 2 | 3 | 4 | 5 |
| PVC | SolVin 263RB | Matrix | 100 | 100 | 100 | 100 | 100 | 100 | 100 |
| Calcium/Zinc | Mark CZ2000 | Stabilizer | 2.5 | 2.5 | 2.5 | 2.5 | 2.5 | 2.5 | 2.5 |
| Acrylic Acid | Paraloid K120 | Processing Aid | 1.0 | 1.0 | 1.0 | 1.0 | 1.0 | 1.0 | 1.0 |
| Di-carboxylate ester | Loxiol G60 | Internal Lubricant | 1.2 | | | | | | |
| 12-hydroxystearic acid | Loxiol G21 | External Lubricant | 0.2 | | | | | | |
| Glycerol ester | Ligalub GT | External Lubricant | 1.2 | | | | | | |
| Polyethylene wax | Licocene PE4201 | External Lubricant | 0.15 | | | | | | |
| High melting FT-wax | H105 | Lubricant | | 1.5 | | | | | |
| Inventive wax | Wax composition A | Lubricant | | | 1.5 | | | | |
| | Wax composition B | Lubricant | | | | 1.5 | | | |
| | Wax composition C | Lubricant | | | | | 1.5 | | |
| | Wax composition D | Lubricant | | | | | | 1.5 | |
| | Wax composition E | Lubricant | | | | | | | 1.5 |
| Wood flour | Arbocel C100 | Filler | 100 | 100 | 100 | 100 | 100 | 100 | 100 |

The fusion times of the different composites shown in table 6 have been determined from the above mentioned plastographs.

TABLE 6

Fusion times of the different dry blends determined with a plastograph

| Dry Blend | Fusion Time | Fusion Torque |
|---|---|---|
| Ref. | 2:53 min | 65.8 Nm |
| Comp. 1 | 3:07 min | 65.1 Nm |
| Inv. 1 | 2:26 min | 66.5 Nm |
| Inv. 2 | 3:13 min | 58.8 Nm |
| Inv. 3 | 2:50 min | 62.3 Nm |

TABLE 6-continued

Fusion times of the different dry blends
determined with a plastograph

| Dry Blend | Fusion Time | Fusion Torque |
| --- | --- | --- |
| Inv. 4 | 3:16 min | 63.5 Nm |
| Inv. 5 | 3:36 min | 58.7 Nm |

It can be clearly seen that the fusion times and fusion torques for the composites with the inventive lubricant waxes are comparable to the ones for the reference and the comparative example. This results in a sufficient fusion period and efficient processing of the WPC when using these waxes as lubricants.

For the evaluation of the mechanical and physical properties of WPCs obtained with the different waxes as lubricant, board specimens of the above dry blends were produced by extrusion and compression molding.

For the extrusion of the dry blends a Battenfeld miniBEX, a conical twin-screw counter-rotating extruder (diameter=54 mm), was used to produce endless tape with a cross section of 40×4 mm. The torque, the average temperature of the melt and the pressure during the extrusion process were monitored. Different speeds (6, 15 and 19 rpm) resulting in 10, 20 or 30 kg/h infeed amounts have been tested. Only the dry blends obtained with the inventive lubricants resulted in satisfying extrudates without any surface defects at the highest speed (see extrusion parameters and results in table 7). The determined mass pressure is a further indicator for the lubrication efficiency.

In table 8 the results are summarized and it can be clearly seen that the best performances are obtained with a medium congealing point, viscosity and content of oxidized hydrocarbons. The performance is not that good anymore if the congealing point and/or content of oxidized hydrocarbons is either too low or high and/or the viscosity is increasing.

TABLE 8

Summary of results

| | Ref. | Comp. 1 | Inv. 1 | Inv. 2 | Inv. 3 | Inv. 4 | Inv. 5 |
| --- | --- | --- | --- | --- | --- | --- | --- |
| Congealing point [° C.] | | 103 | 57.5 | 77.5 | 81 | 84 | 102 |
| Dynamic viscosity at 120° C. [mPa · s] | | 17.9 | 3.0 | 4.6 | 6.7 | 10.0 | 24.4 |
| Acid number [mg KOH/g] | | <0.1 | 0.4 | 0.3 | 8.8 | 8.1 | 8.9 |
| Fusion Time [min] | 2:53 | 3:07 | 2:26 | 3:13 | 2:50 | 3:16 | 3:36 |
| Fusion Torque [Nm] | 65.8 | 65.1 | 66.5 | 58.8 | 62.3 | 63.5 | 58.7 |
| Optical appearance of extrudates at 30 kg/h | – | – | + | ++ | +++ | ++(+) | ++ |
| Mass pressure at 30 kg/h | 113.8 | 111.1 | 111.7 | 85.2 | 87.8 | 98.6 | 96.1 |

For the compression molding the dry blends were compounded for 10 minutes employing the plastograph and settings mentioned above. The resultant compound was milled with a Retsch SM 2000 rotary cutting mill with an 8

TABLE 7

Extrusion parameters and surface appearance of products obtained therefrom

| | Ref. | Comp. 1 | Ref. | Comp. 1 | Ref. | Comp. 1 |
| --- | --- | --- | --- | --- | --- | --- |
| Speed [rpm] | 6 | 6 | 15 | 15 | 19 | 19 |
| Pressure [bar] | 105 | 101 | 102.4 | 97.7 | 113.8 | 111.1 |
| Appearance | rough | rough | Surface defects (Shark skin) | Surface defects (Shark skin) | Surface defects (Shark skin) | Surface defects (Shark skin) |
| | Inv. 1 | Inv. 2 | Inv. 1 | Inv. 2 | Inv. 1 | Inv. 2 |
| Speed [rpm] | 6 | 6 | 15 | 15 | 19 | 19 |
| Pressure [bar] | 75.8 | 74.8 | 86 | 79.9 | 117.7 | 85.2 |
| Appearance | smooth | smooth | smooth | smooth | smooth | smooth |
| | Inv. 3 | Inv. 4 | Inv. 3 | Inv. 4 | Inv. 3 | Inv. 4 |
| Speed [rpm] | 6 | 6 | 15 | 15 | 19 | 19 |
| Pressure [bar] | 75 | 86.6 | 70 | 80.5 | 87.8 | 98.6 |
| Appearance | smooth | smooth | smooth | smooth | smooth | smooth |
| | Inv. 5 | | Inv. 5 | | Inv. 5 | |
| Speed [rpm] | 6 | | 15 | | 19 | |
| Pressure [bar] | 87 | | 88.8 | | 96.1 | |
| Appearance | smooth | | smooth | | smooth | | mm mesh size. A small scale Siempelkamp press was used to produce compression molding boards of the dimensions of 240×170×4 mm. Uniform dimensions were accomplished by the application of a metal template. The WPC-granulate was piled by hand in the middle of the template to provide for a minimum of melt flow. The temperature was set to 180° C. during the whole process and the pressing sequence according to table 9 was used.

TABLE 9

Pressing sequence applied to dry blends during compression molding

| Time | Pressure/Distance between plates |
|---|---|
| 300 s | 80 mm |
| 360 s | Until 4 mm - 20 bar |
| 700 s | Release pressure |
| 890 s | 60 bar |
| 900 s | 100 bar |

Afterwards the heating was turned off and the water cooling was turned on manually. Once the temperature was as low as 80° C. the pressing cycle was completed.

The WPC boards were stored between two weighted metal plates for further cooling until room temperature. After cooling, specimens were cut from the boards with a circular saw.

The flexural properties of the specimens were tested according to DIN EN ISO 178 (2003) in a three point flexural test design. A Zwick/Roell Z050 universal testing machine equipped with a 5 kN Xforce HP load cell and an extensometer was utilized. Specimens of the dimensions 80×10×4 mm were used. The supporting width was 64 mm. Testing speed was set to 1 mm/min.

The tensile properties were determined according to DIN EN ISO 527-1 (1996). A Zwick/Roell Z050 equipped with a 5 kN Xforce HP load cell and an extensometer was utilized. The dimensions of the dump-bell-shaped specimens were in accordance to type 1b in DIN EN ISO 527-2 (1996). Testing speed was set to 1 mm/min. The results of these tests can be found in table 10.

TABLE 10

Flexural and tensile Moduli of elasticity

| Specimen | Flexural modulus of elasticity (Mean), [MPa] | Standard deviation | Tensile modulus of elasticity (Mean), [MPa] | Standard deviation |
|---|---|---|---|---|
| Ref. | 5550 | 304 | 5337 | 222 |
| Comp. 1 | 5757 | 344 | 5625 | 123 |
| Inv. 2 | 6270 | 500 | 6049 | 110 |

The colour evaluation of the specimens was conducted with an Epson Expression 10000 XL and Adobe Photoshop CS6. Scans of the specimens were used to obtain sRGB files. These files were converted into CIELab values with the Photoshop software and the values for lightness (L) as well as green and mangenta (a) and yellow and blue (b) respectively have been compared (table 11). No decisive differences in the colour appearance of the specimens could be determined herein, despite that Comp. 1 and Inv. 2 were slightly lighter than the reference.

TABLE 11

Colour evaluation

| Specimen | L-value (lightness) | a-value (green and magenta) | b-value (yellow and blue) |
|---|---|---|---|
| Ref. | 16.3 | 1.2 | 5.2 |
| Comp. 1 | 22.5 | 2.6 | 7.9 |
| Inv. 2 | 20.5 | 2.4 | 7.3 |

All these results show that lubricant compositions for wood plastic composites according to the invention have superior effects during processing. The extrusion speed for WPCs with the inventive lubricant composition could be increased three times while maintaining good product qualities (no surface defects, no colour deterioration and high mechanical stability).

The invention claimed is:

1. A wood plastic composite composition comprising:
at least one wood component;
at least one thermoplastic polymer;
wax hydrocarbons having 15 to 110 carbon atoms; and
oxidized hydrocarbons having 15 to 110 carbon atoms consisting of hydrocarbons having at least one of hydroxyl-, carbonyl-, carboxylate- and lactone-group,
wherein the mixture consisting of the wax hydrocarbons and the oxidized hydrocarbons is a wax composition having
a dynamic viscosity at 120° C. of below 25 mPa·s;
a content of molecules in which the carbon chain is linear of more than 65 wt.-%;
a congealing point according to ASTM D 938 from 55° C. to 105° C.;
a content of the oxidized hydrocarbons of at least 1 to 20 wt.-% with respect to the wax composition; and
an acid number according to ASTM D 1386 of 0.1 to 10 mg KOH/g; and wherein the wax hydrocarbons are a Fischer-Tropsch wax and the oxidized hydrocarbons originate from an oxidation of a Fischer-Tropsch wax.

2. The wood plastic composite composition according to claim 1, wherein the thermoplastic polymer is one or more of polyolefins.

3. The wood plastic composite composition according to claim 1, wherein the wood component consists of lignocelluloses from non-wood or wood plants or combinations thereof.

4. The wood plastic composite composition according to claim 1, wherein the oxidized hydrocarbons and/or the wax composition have/has a ratio of alcohols to esters/acids to ketones/aldehydes of 1:0.1 to 3:0.1 to 2.

5. The wood plastic composite composition according to claim 1, wherein the wax composition has a dynamic viscosity at 120° C. of 10 mPa·s or below.

6. The wood plastic composite composition according to claim 1, wherein the wax composition has a dynamic viscosity at 180° C. of 10 mPa·s or below.

7. The wood plastic composite composition according to claim 1, wherein the content of molecules in the wax composition having a linear carbon chain is above 75 wt.-%.

8. The wood plastic composite composition according to claim 1, wherein the congealing point of the wax composition is between 75 to 105° C.

9. The wood plastic composite composition according to claim 1, wherein the density of the wax composition at 120° C. according to EN ISO 12185 is below 0.9 g·cm$^{-3}$.

10. The wood plastic composite composition according to claim 1, wherein the molar mass (number average) of the molecules in the wax composition is between 300 to 1500 g·mol$^{-1}$.

11. The wood plastic composite composition according to claim 1, comprising 25 to 400 phw thermoplastic polymer.

12. The wood plastic composite composition according to claim 1, comprising 0.1 to 40 phw of the wax composition.

13. The wood plastic composite composition according to claim 1, wherein more than 50 wt.-% of the composition consist of the wood components, the thermoplastic polymer and the wax composition.

14. A method of processing a wood plastic composite composition comprising the steps of
   compounding
      at least one wood component;
      at least one thermoplastic polymer and
      the wax composition as defined in claim 1, or the wax hydrocarbons and the oxidized hydrocarbons added separately from each, both as defined in claim 1,
   at above the congealing point of the wax composition to obtain a wood plastic composite compound; and
   consolidating the compound at temperatures above the melting point of the thermoplastic polymer and below the decomposition temperature of the wood components to obtain a finished wood plastic composite.

15. The wood plastic composite composition according to claim 2, wherein the one or more polyolefins is selected from the group consisting of polyethylene, polypropylene, polyvinylchloride, and mixtures thereof.

* * * * *